United States Patent Office 2,851,436
Patented Sept. 9, 1958

2,851,436

METHOD OF MAKING DIISOCYANATE-MODIFIED POLYESTER WITH POLYMERIZED VINYL HALIDE

Alan K. Forsythe, Manor Township, Lancaster County, Pa., assignor to Armstrong Cork Company, Lancaster, Pa., a corporation of Pennsylvania No Drawing. Application September 26, 1955
Serial No. 536,735

10 Claims. (Cl. 260—45.4)

This invention relates generally to compositions of matter, and more particularly to a method of making such compositions. Still more particularly, it relates to a binder system for surface covering materials wherein the binder system comprises an intimate blend of polymerized vinyl halide and diisocyanate-modified polyester.

In recent years, a tough resilient plastic surface covering has been produced by forming a composition containing filler and binder—the binder including a polyvinyl resin and a butadiene-acrylonitrile copolymer calendering the composition into a sheet, and curing the resulting material in air at elevated temperatures. The basis of the binder of the composition is a mixture of polyvinyl chloride and a butadiene-acrylonitrile copolymer, which copolymer advantageously contains 40%–70% by weight of butadiene and about 30%–60% by weight acrylonitrile. Such a mixture may be obtained by milling the polyvinyl chloride into the copolymer until a homogeneous mass is obtained. Although surface covering materials fabricated from a binder system as described above have been satisfactory, there is always a need for other binder systems which possess desirable properties to an even greater extent than can be obtained from those currently available. Thus, a binder system possessing greater wet wear abrasion resistance and enhanced tensile strength, while at the same time preserving the necessary other properties needed in a surface covering material, would be extremely advantageous.

It is the primary object of the present invention to present a method of making such a binder. It is a further object to present a method of making novel binder systems for surface covering materials; which binder systems may be prepared and processed on equipment normally in use in the surface covering industry.

To this end, the invention contemplates a binder system for surface covering materials prepared by dissolving diisocyanate-modified polyester and polymerized vinyl halide in solvent, which solvent is at least partially water-soluble. Water is then added to the solution to precipitate the binder system in intimately blended and dispersed form. The modified polyester is the reaction product of sufficient organic diisocyanate with unmodified polyester to form an incipient gel. The unmodified polyester has an acid number in the range of about 2–15 and a hydroxyl number in the range of about 20–55 and is formed from a saturated glycol having 4–6 carbon atoms, a saturated dibasic acid having 6–10 carbon atoms, and a dibasic acid possessing a single unsaturated bond and having no more than 8 carbon atoms; the saturated acid and the unsaturated acid are present in the polyester in a mole ratio of about 2:1.

The polyester utilized in the present invention is one having narrow and critical properties. It may be prepared in unmodified form only from three classes of ingredients. The first ingredient must be a 4-carbon saturated glycol, as for example, 1,3-butylene glycol, 1,4-butylene glycol, diethylene glycol, and the like. The second ingredient must be a saturated dibasic acid having a carbon chain of 6 to 10 carbon atoms, as for example, adipic, sebacic, azeleic, methyl adipic acid, and the like. The third ingredient is a dibasic acid possessing a single unsaturated bond and having no more than 8 carbon atoms, as for example, tetrahydrophthalic, maleic, fumaric, and similar acids. The ratio of saturated dibasic acid to the unsaturated dibasic acid must be about 2:1 on a mole basis. Generally, the total hydroxyl equivalents in the glycol will equal the total carboxylic acid equivalents in the two acids, except for the fact that it is customary to use an excess of glycol in the making of polyesters.

The preparation of the polyester may be carried out along the lines of known polyester technics. Preferably, the glycol may be caused to react with the unsaturated acid at a temperature of about 90° C. Because the unsaturated acid may sublime very readily at higher temperatures, the mixture of glycol and unsaturated acid may be heated until the half ester of the unsaturated acid is formed. The end of the formation of the half ester can readily be seen by the disappearance of the white solid unsaturated acid from the solution, causing the solution to become homogeneous. Maleic anhydride reacts the fastest and usually requires about 5 to 10 minutes for the formation of the half ester. Tetrahydrophthalic anhydride and endomethylene tetrahydrophthalic anhydride react more slowly because they are less soluble in the glycols.

Once the half ester is formed, the unsaturated acid is more stable at elevated temperatures. Subsequent to the formation of the half ester of the unsaturated acid, the saturated dibasic acid may be added and the temperature of the mixture may be increased to about 145° C.

During the addition of the unsaturated and saturated acid, an inert gas flow should be maintained through the solution to minimize side reactions that might occur in the presence of air. Most of the unsaturated acids used are sensitive to oxygen and the double bond oxidizes readily. This oxidation of the double bond might lead to cross linking of chains and subsequent formation of a gel, an undesirable reaction at this point. The ease with which this oxidation occurs is dependent upon the unsaturated acid used. The ester containing maleic anhydride and endomethylene tetrahydrophthalic anhydride oxidizes more easily than one containing tetrahydrophthalic anhydride.

After holding the temperature at 145° C. for a suitable period of time, for example about 1 hour, the temperature may be increased slowly, for example to about 200° C. The time required for this increase of temperature is dependent upon the boiling point of the glycol used. If the boiling point of the glycol is below about 210° C., the time required would be on the order of 2 to 3 hours, while boiling points above about 210° C. allow a reduction of time to about 1 to about 1½ hours.

The temperature should be held at about 200° C. until an acid number of about 30 is obtained. If the glycol boils above about 210° C., the temperature may then be increased from 200° C. to about 220° C., but for those boiling below about 210° C., the temperature should be maintained at about 200° C. In any case, these temperatures should be maintained at their respective levels until the final end point is reached. In the later stages of polymerization, where the acid number is below about 30 and the hydroxyl number is to be lowered further, the rate of decrease of the hydroxyl number may be dependent upon both the rate of flow of carbon dioxide or other inert gas and the temperature of the polymer. In order to obtain a rapid decrease of the hydroxyl number in the later stages of polymerization, the temperature of the polyester should be above the boiling point of the glycol used and the gas flow increased to such a rate that the volatile glycol is swept from the reaction mixture. For the polyesters to be suitable for use in the present invention, it is necessary to obtain an acid number in the range of about 2–15 and a hydroxyl number in the range of about 20–55. A preferred embodiment calls for an acid number in the range of about 5±2 and a hydroxyl number of 35±5. With these latter limits on acid numbers and hydroxyl numbers, the number average molecular weight will vary from about 3400 to about 2380.

The chain length of the molecules of the above-described polyesters should then be extended by means of diisocyanates. Although the particular diisocyanate to be used is not critical, such considerations as handling hazards and cost make 2,4-toluene diisocyanate the diisocyanate of choice. Additional diisocyanates which may be used are 4,4'-diphenyl diisocyanate, 4,4'-diphenylene methane diisocyanate, dianisidene diisocyanate, 4,4'-tolidene diisocyanate, the naphthalene diisocyanates, and p-phenylene diisocyanate. The proper amount of the diisocyanate should be intimately blended with the polyester, preferably at room temperature, and the mixture then heated to a temperature in the range of about 100°–150° C. to accomplish incipient gelation.

The precise amount of diisocyanate to be added to a given amount of polyester will vary slightly according to the particular polyester involved and the reaction conditions utilized in making the particular polyester to be chain-extended. It should be noted that batches of polyester prepared from the same reactants and under apparently the same conditions may still call for different amounts of a diisocyanate to accomplish optimum chain extension.

The precise amount of diisocyanate to be added to the polyester should be that amount needed to give an incipient gel, and no more. For any given polyester, this amount may readily be empirically determined by withdrawing a series of samples of the polyester and by adding to the weighed samples varying and increasing amounts of diisocyanate. The samples are then heated to about 100°–150° C. and cooled. The sample containing the proper amount of diisocyanate will be that sample which neither flows easily nor sets to a stiff gel. The amount of diisocyanate which will yield a chain-extended polyester wherein an air bubble will either just rise or just not rise will yield the chain-extended polyester which can be used as a component in the binder system for surface covering materials. Generally speaking, this amount of diisocyanate will be that amount by weight equal to 0.6–0.9 isocyanate equivalent for each polyester equivalent. The point of incipient gelation defines the point where chain extension of the polyester is at a maximum and cross linking has just begun to occur.

The vinyl resins to be used in the binder system of the present invention may be those low to medium molecular weight polymerized vinyl halides available in commerce. Exemplary of the polyvinyl chlorides (including vinyl chloride-vinyl acetate copolymers) susceptible of use in the present invention are those made by the Bakelite Company bearing the designations "VYVF," "VYNW," "VYHH," and "VYCN." Additionally, the Geon resins sold by the B. F. Goodrich Chemical Company, in particular those designated as "Geon 121" and "Geon 126," are suitable. Suitable resins include copolymers of vinyl chloride with varying amounts of vinyl acetate. The most significant property of the polymerized vinyl halide resins suitable for use in the binder system of the present invention is that of solubility in a solvent, which solvent is at least partially water-soluble.

The solvents useful in forming the binder system of the present invention are those solvents which will dissolve the diisocyanate-modified polyester and which will also dissolve the polymerized vinyl halide resin and which are at the same time at least partially water-soluble. Exemplary of such solvents are methyl ethyl ketone, methyl isobutyl ketone, tetrahydrofurane, cyclohexanone, dioxane, dimethyl formamide, and the like. Additionally, there may be used mixtures of solvents, for example a 50–50 mixture of xylol and methyl ethyl ketone. Isophorone may be used. At elevated temperatures, aromatic solvents such as benzene, toluene, xylene, and the like may be used.

The invention contemplates simply dissolving in a suitable solvent those amounts of diisocyanate-modified polyester and polymerized vinyl halide resin necessary to form a binder system for surface covering material; this will vary from about 30%–70% by weight of the modified polyester. Generally speaking, the weight of solvent necessary will depend on the precise solvent properties of the solvent chosen; but as a general rule, the amount of solvent will be about 2–3 times the weight of the polyester plus the polymerized vinyl halide resin.

The modified polyester may be dissolved in the solvent with agitation, followed by the addition and solution of the polymerized vinyl halide resin. Alternatively, the polymerized vinyl halide resin may be dissolved first and the polyester dissolved second. If desired, the polyester and the resin may be dissolved in separate portions of the solvent and the portions combined. In this latter case, it is apparent that it is unnecessary that the same solvent be used for the two components so long as the solvents are compatible.

Once the modified polyester and the polymerized vinyl halide resin have been completely dissolved, the binder system of the present invention may be precipitated out of solution in an intimate and homogeneous dispersion by the mere addition of water to the solution. The amount of water to be added is not critical, since once the solubility of the water in the solvent has been exceeded in those cases where the solvent has a limited solubility for water, all of the binder system will have been precipitated. It is generally preferred, however, that the amount of water to be added to the solution is at least about equal in weight to the total weight of the solution.

The precipitated binder system may then be collected as by decantation, filtration, or other means, dried, and utilized in normal manner and on the usual equipment for the fabrication of surface covering materials.

In order to remove excess solvent, the product may be thoroughly washed with water before drying. Drying is preferably carried out below the fusion temperature of the particular polymerized vinyl halide resin.

As can be seen from the above, the compositions comprise a binder containing polymerized vinyl halide, preferably polyvinyl chloride, and a modified polyester. It is also possible to utilize a composition which contains other ingredients besides the basic binder components. For example, vinyl chloride-vinyl acetate copolymer may be incorporated into the binder, as well as synthetic rubber, such as butadiene-styrene copolymers, butadiene-acrylonitrile copolymers, chloroprene polymers, and the like. Additionally, a portion of the binder may be replaced with additional and different polyesters. All these additional ingredients may be milled or otherwise blended into the binder system in accordance with known processes.

The product obtained by the above-described processes is a light-colored, vulcanizable, exceedingly tough material, pre-eminently suitable for use as a binder system in surface covering applications.

To produce a floor covering having the desired pattern without the use of special equipment or excessive horsepower, the binder system of the present invention advantageously contains about 30% to about 70% by weight of polymerized vinyl halide resin and about 70% to about 30% by weight of the modified polyester. When less than about 30% by weight of the polyester is found in the binder composition, the composition is too tough and requires excessive horsepower and equipment of great strength in order to work the composition. When more than about 70% by weight of the polyester is present, the material is too elastic to be worked, and it is difficult to obtain the desired pattern in the finished floor covering.

Generally speaking, the binder comprises about 50% to about 30% by weight of the wearing surface composition. The binder is admixed with filler, including pigment, in such proportions that the filler comprises about 50% to about 70% by weight of the composition. When the filler content is below about 50%, pattern control is sometimes difficult. When more than about 70% by weight of filler is present, the physical properties of the finished surface covering material do not measure up to the desired standards, particularly in the floor covering art. Particularly advantageous results have been obtained when the filler includes a preponderant proportion by volume of fibrous filler, such as wood flour, cork particles, asbestos, mineral fibers, and the like. The remainder of the filler component is comprised of finely divided particles, such as whiting, clay, silica, slate flour, and similar nonfibrous filler material. Also included in the filler component are small but effective amounts of well-known vulcanizing agents, curing accelerators, lubricants, and the like. The total amount of such compounding agents is generally up to about 10% by weight of the filler.

Although such surface covering materials are particularly well suited for use as floor coverings, the materials may also be employed as a covering for walls, desk tops, counter tops, sink tops, table tops, and the like.

The following examples illustrate several embodiments of the invention. All parts are by weight unless otherwise stated.

Example I

To a 3-liter, 3-necked flask fitted with sealed stirrer, an electrically heated reflux condenser attached to a water-cooled take-off condenser, an inlet for the admission of carbon dioxide gas, a thermal regulator, and a thermometer, was added 643 parts (7.14 moles, 19% excess) 1,4-butanediol. The dried carbon dioxide flow rate was kept at 0.3 liter per minute and the temperature of the 1,4-butanediol was increased to 80° C. To the heated 1,4-butanediol was added 304.3 parts (2 moles) tetrahydrophthalic anhydride. The anhydride was added slowly to the reaction mixture so there would not be a sharp decrease in temperature. Mixing was continued until a homogeneous solution was obtained, and then 584.8 parts (4 moles) adipic acid was added slowly to the hot stirred mixture. After all the adipic acid was added, the temperature was increased to 145° C. over a period of 30 minutes and held at that temperature for 1 hour. The gas flow was kept at 0.3 liter per minute, and at a temperature of 145° C. some water started to distill off.

The temperature was then raised to 200° C. over a period of 90 minutes and maintained at that temperature until an acid number of 30 ± 2 was obtained. The time required to reach that acid number was approximately 400 minutes. When an acid number of 30 was obtained, the temperature of the mixture was raised to 230° C. over a period of 60 minutes and the flow of carbon dioxide was increased to 2.5 liters per minute. The temperature was maintained at 230° C. for 200 minutes, after which the temperature was increased to 245° C. over a 60-minute period and the gas flow was increased to 3.5 liters per minute. The batch temperature was maintained at 245° C. until an acid number of 3–6 was obtained. The final hydroxyl number was 27. The polyester was then cooled.

Into a kettle equipped with an agitator was placed 2500 parts of the above polyester and the charge was heated to 260° F. (127° C.) with agitation. At that temperature, 110.2 parts 2,4-toluene diisocyanate was added and the mixture was maintained at 260° F. with agitation for 30 minutes. At the end of that time, the mixture was a thick viscous liquid which was poured from the kettle into a greased pan and allowed to cool. The gelling reaction was completed by placing the polyester in the greased pan in an oven heated at 220° F. for a period of 12 hours. At the end of that time, the modified polyester was a thick viscous gum.

100 parts of a diisocyanate-modified polyester described above was dissolved with agitation in 600 parts tetrahydrofurane. To the solution was added 100 parts of the polyvinyl chloride resin designated as "Geon 103EP." Agitation was continued until a homogeneous and clear solution was formed.

To the above-described solution was added 1000 parts water. A light-colored tough material precipitated out. This material was thoroughly washed with water and was then dried at 90° C.

This light-colored material was formulated into resilient flooring composition in the Banbury mixer. The composition was formed into resilient flooring in accordance with the usual technics, producing a flooring having excellent physical properties.

Example II

To a 5-liter, 4-necked flask equipped as described in Example I was added 1928 parts (21.4 moles, 19% mole excess) 1,4-butanediol and 588 parts (6 moles) maleic anhydride. The mixture was heated, and after about 20 minutes the maleic anhydride was in solution and 1754 parts (12 moles) adipic acid was added. The gas flow was maintained at 0.4 liter carbon dioxide per minute. After the adipic acid was added, the temperature of the mixture was increased to 140° C. over a period of 45 minutes and held at this temperature for 120 minutes. Over a period of 225 minutes, the temperature of the polyester was increased to 200° C. and was maintained at 200° C. for 620 minutes. After an acid number of 15 was obtained, the temperature was increased to 215° C. over a period of 15 minutes and was held at that temperature for the remainder of the reaction cycle. The total reaction time for the preparation of this polyester was 1100 minutes, and the final acid number and hydroxyl number was 12 and 23, respectively.

500 parts of the above polyester was converted to an incipient gel by the addition of 2,4-toluene diisocyanate in accordance with Example I; 18 parts of the diisocyanate was required.

150 parts of the above described modified polyester was dissolved in 750 parts methyl isobutyl ketone, to which was then added 100 parts of the vinyl chloride-vinyl acetate (containing about 13% vinyl acetate) resin designated as "VYHH." Subsequently there was added 1000 parts by weight water to precipitate a tough, homogeneous material.

When this material was fabricated into a resilient surface covering in accordance with the usual processes, an excellent surface covering resulted.

Example III

A mixture of 1609 parts (17.88 moles, 19.2% mole excess) 1,4-butanediol and 820 parts (5 moles) endomethylene tetrahydrophthalic anhydride was heated in a 5-liter, 4-necked flask equipped as described in Example I. After the endomethylene tetrahydrophthalic anhydride was dissolved, 1461 parts (10 moles) adipic acid was added and the temperature was increased at 145° C. over a period of 50 minutes. The temperature was held at 145° C. for 120 minutes and then increased to 200° C. over a period of 60 minutes. The gas flow was maintained at 0.4 liter of carbon dioxide per minute. The temperature was held at 200° C. until an acid number of 10 was obtained. The whole time at 200° C. was approximately 615 minutes. Over a period of 60 minutes the temperature was raised to 215° C. and the gas flow was increased at the same time to 4.0 liters per minute. The reaction was terminated when an acid number of 3.8 and a hydroxyl number of 40 was obtained. The total time required for the preparation of this polyester was 1630 minutes.

500 parts of the above-described polyester was converted to an incipient gel at elevated temperature by the addition of 31.6 parts 2,4-toluene diisocyanate in the usual manner.

To 600 parts methyl ethyl ketone was added 100 parts of the above-described diisocyanate-modified polyester and 150 parts of mill-end scrap vinyl. After solution had been accomplished, the solution was filtered and 800 parts by weight water added to precipitate the binder system.

Flooring materials fabricated from this binder had excellent properties.

I claim:

1. The method of making a vulcanizable composition of matter which comprises dissolving about 30%–70% by weight of said composition of diisocyanate-modified polyester and about 70%–30% by weight of said composition of polymerized vinyl chloride in solvent, which solvent is at least partially water-soluble, and adding water to so-formed solution to precipitate said composition, said modified polyester being the reaction product of –0.6–0.9 equivalents of organic diisocyanate per equivalent of unmodified polyester sufficient to form an incipient gel, said unmodified polyester having an acid number in the range of about 2–15 and a hydroxyl number in the range of about 20–55 and being formed from a saturated glycol having 4 carbon atoms, a saturated dicarboxylic acid having 6–10 carbon atoms, and a dicarboxylic acid possessing a single unsaturated bond and having no more than 8 carbon atoms, said saturated acid and said unsaturated acid being present in a mole ratio of about 2:1.

2. The method according to claim 1 wherein said unmodified polyester comprises tetramethylene adipate tetrahydrophthalate.

3. The method according to claim 1 wherein the weight of said solvent is about 3 times the weight of said diisocyanate-modified polyester and said polymerized vinyl halide.

4. The method according to claim 1 wherein said polymerized vinyl chloride comprises polyvinyl chloride.

5. The method according to claim 1 wherein said solvent comprises a ketone.

6. The method according to claim 5 wherein said ketone is methyl isobutyl ketone.

7. The method of making a binder system for surface covering materials which comprises dissolving about 30%–70% by weight of said binder system of diisocyanate-modified polyester and about 70%–30% by weight of said binder system of polymerized vinyl chloride in solvent capable of dissolving said polyester and said vinyl chloride, which solvent is at least partially water-soluble, and adding water to so-formed solution to precipitate said binder system, said modified polyester being the reaction product of 0.6–0.9 equivalents of organic diisocyanate per equivalent of unmodified polyester sufficient to form a gel, said unmodified polyester having an acid number in the range of about 2–15 and a hydroxyl number in the range of about 20–45 and being formed from 1,4-butanediol, adipic acid, and tetrahydrophthalic acid, said adipic acid and said tetrahydrophthalic acid being present in a mole ratio of about 2:1.

8. The method according to claim 7 wherein said organic diisocyanate comprises 2,4-toluene diisocyanate.

9. The method according to claim 7 wherein said polymerized vinyl chloride comprises polyvinyl chloride.

10. The method according to claim 7 wherein said acid number is in the range of about 3–7 and said hydroxyl number is in the range of about 30–40.

References Cited in the file of this patent

UNITED STATES PATENTS

| | | |
|---|---|---|
| 2,491,923 | Johnson | Dec. 20, 1949 |
| 2,606,162 | Coffey et al. | Aug. 5, 1952 |
| 2,698,838 | Simon et al. | Jan. 4, 1955 |
| 2,725,366 | Seeger et al. | Nov. 29, 1955 |
| 2,777,831 | Seeger et al. | Jan. 25, 1957 |

FOREIGN PATENTS

| | | |
|---|---|---|
| 515,582 | Great Britain | Dec. 8, 1939 |
| 638,118 | Great Britain | May 31, 1950 |